United States Patent
Gorun et al.

(10) Patent No.: US 8,349,457 B2
(45) Date of Patent: *Jan. 8, 2013

(54) THIN FILM APPLICATIONS OF PERFLUOROISOPROPYL-SUBSTITUTED PERFLUOROPHTHALOCYANINES

(75) Inventors: Sergiu M. Gorun, Montclair, NJ (US); Olga Tsaryova, Ulm (DE); Lukasz Lapok, Slaskie (PL)

(73) Assignee: New Jersey Institute of Technology, Newark, NJ (US)

( * ) Notice: Subject to any disclaimer, the term of this patent is extended or adjusted under 35 U.S.C. 154(b) by 218 days.

This patent is subject to a terminal disclaimer.

(21) Appl. No.: 12/628,307

(22) Filed: Dec. 1, 2009

(65) Prior Publication Data

US 2010/0233845 A1    Sep. 16, 2010

Related U.S. Application Data

(63) Continuation-in-part of application No. 11/349,492, filed on Feb. 7, 2006, now Pat. No. 7,670,684.

(60) Provisional application No. 61/118,830, filed on Dec. 1, 2008.

(51) Int. Cl.
*B32B 27/00* (2006.01)
*B32B 27/18* (2006.01)
*B32B 9/00* (2006.01)
*B05D 3/10* (2006.01)

(52) U.S. Cl. ..... 428/421; 428/422; 427/367; 427/372.2; 430/78; 430/135; 528/402

(58) Field of Classification Search ............. 428/421, 428/422; 427/367, 372.2; 430/78, 135; 528/402
See application file for complete search history.

(56) References Cited

U.S. PATENT DOCUMENTS

| 5,238,764 | A  | 8/1993 | Molaire et al. |
| 5,238,766 | A  | 8/1993 | Molaire et al. |
| 6,511,971 | B1 | 1/2003 | Gorun |
| 7,670,684 | B2 | 3/2010 | Gorun |

FOREIGN PATENT DOCUMENTS

| EP | 0337209 | * 10/1889 |
| WO | 00/21965 | 4/2000 |

OTHER PUBLICATIONS

Leznoff, et al., Phthalocyanines: Properties and Applications (Tables of Contents only), VCH Publishers, New York, 1990-1996, vols. 1-4.
Saji, Thin Film Phthalocyanine Chemistry and Technology, pp. 167-195.

(Continued)

*Primary Examiner* — Duc Truong
(74) *Attorney, Agent, or Firm* — McCarter & English, LLP (57) ABSTRACT

Perfluoroisopropyl-substituted perfluorophtalocyanines, including zinc (II), copper (II) and oxo-vanadium (IV) complexes of 29H,31H,1,4,8,11,15,18,22,25-octakis-fluoro-2,3, 9,10,16,17,23,24-octakis-perfluoro(isopropyl)phthalocyanine ($F_{64}Pc$), may be sublimed under high vacuum conditions. The compounds/molecules produce advantageous thin films (20-100 nm) on glass substrates by physical vapor deposition. Many potential applications of the disclosed compounds/molecules are disclosed, e.g., as semiconductor materials. In situ electrical conduction and optical transmission measurements during the deposition process reveal the formation of conducting pathways and potential microscopic intermolecular electronic couplings.

13 Claims, 7 Drawing Sheets

OTHER PUBLICATIONS

McKeown, Phthalocyaine Materials: Synthesis, Structure and Function (Table of Contents only), Cambridge University Press, Cambridge, 1998, pp. vii-x.
Shirk, et al., Lead Phthalocyanine Reverse Saturable Absorption Optical Limiters, Pure Appl. Opt. 5, 1996, pp. 701-707.
Bench, et al., Perfluoroalkyl Phthalocyanines, (Communications) Agnew. Chem. Int. Ed., 2002, vol. 41, No. 5.
Liao, et al., Effects of Peripheral Substituents and Axial Ligands on the Electronic Structure and Properties of Iron Phthalocyanine, Inorganic Chemistry, vol. 43, No. 22, 2004, pp. 7151-7161.
Keizer, et al., Spectroscopy and Electronic Structure of Electron Deficienct Zinc Phthalocyanines, J. Am. Chem. Soc., 2003, vol. 125, pp. 7067-7085.
PCT International Search Report dated Mar. 20, 2008.

* cited by examiner

THIN FILM APPLICATIONS OF PERFLUOROISOPROPYL-SUBSTITUTED PERFLUOROPHTHALOCYANINES

CROSS-REFERENCE TO RELATED APPLICATIONS

The present application claims priority benefit to a provisional patent application entitled "Novel Molecules Including Perfluoroisopropyl-Substituted Perfluorophtalocyanines and Thin Film Applications," which was filed on Dec. 1, 2008, and assigned Ser. No. 61/118,830. The present application also claims priority benefit to a non-provisional patent application entitled "Functional Coating Compositions of Perfluoroalkyl Perfluor-Phtalocyanine Compounds," which was filed on Feb. 7, 2006, and assigned Ser. No. 11/349,492 now U.S. Pat. No. 7,670,684. The contents of the foregoing provisional and non-provisional applications are incorporated herein by reference.

BACKGROUND

1. Technical Field

The present disclosure is directed to perfluoroisopropyl-substituted perfluorophtalocyanines, including zinc (II), copper (II) and oxo-vanadium (IV) complexes of 29H,31H,1,4,8,11,15,18,22,25-octakis-fluoro-2,3,9,10,16,17,23,24-octakis-perfluoro(isopropyl)phthalocyanine ($F_{64}$Pc). The disclosed ligand exhibits bulky i-$C_3F_7$ ($R_f$) peripheral groups. Alternative complexes include alternative transition metal constituents and TiO. The disclosed compounds/molecules can be sublimed under high vacuum conditions. In addition, the disclosed compounds/molecules produce advantageous thin films (20-100 nm) on glass substrates by physical vapor deposition. Many potential applications of the disclosed compounds/molecules are disclosed, e.g., as semiconductor materials and in devices.

2. Background Art

Phthalocyanines (Pc) have long proven to be of high interest in both basic research and practical applications due to their electrical and optical properties [1]. Metallated macrocyclic metal complexes such as PcM, are of considerable value because of the numerous possibilities of chemical modifications of both the central metal and organic ligand, viz., the ring substituents. Their electrical properties are of particular interest, provided crystals and thin films can be obtained. Even though the charge carrier mobility in PcM thin films is typically lower than in many other molecular semiconductors, crystals of phthalocyanines that showed a field-effect mobility of up to 1 $cm^2V^{-1}s^{-1}$ have been grown.

Chemical modification of phthalocyanines leads to systematic changes in both their redox potential and molecular configuration, opening the possibility of detailed tuning of the structure and energy levels in the solid state. One approach to modifying phthalocyanines is aimed at the metal core, the nature of which can be varied and to which a variety of axial ligands can be attached. Axial ligands range from single atoms, such as halogen and oxygen, present for example in PcV=O, PcTi=O, PcInCl and PcAlF, to organic groups such as methyl, ethyl, pyridine, or fluorophenyl. A second path to new Pc complexes is to vary the ring substituents. For example, F-atoms can be introduced to modify the periphery of the Pc ligand, leading to partly ($F_4$Pc [2], $F_8$Pc [2], $F_{14.5}$Pc [3,4]) or perfluorinated phthalocyanines ($F_{16}$Pc [5]). Both the metal centers (and their axial ligands), as well as the ring substituents, induce a variety of solid-state architectures, as revealed, for example, by single-crystal X-ray structure determinations.

In addition to packing forces present in the crystalline state, the assembly of the same materials, evaporated to produce thin films, is further influenced by the choice of substrate (e.g. metal, inorganic oxide insulator, organic polymer insulator) as well as the evaporation conditions [3-11]. Fluorination can alter not only the crystal structure but also the growth mode of thin films prepared from fluorinated phthalocyanines [11-13]. Thus, it is notable that, independent of the work of the inventor herein, with the exception of a monochlorinated Pc [14], no single-crystal X-ray structure of ring-halogenated PcM could be found in the Cambridge Structural Database, despite the fact that many halogenated phthalocyanines were reported. Of further note, ring halogenation may not result in a major deviation from planarity, and frequently allows the formation of conductive films in the monolayer thickness range whose electronic properties are distinct from those of films prepared from non-halogenated phthalocyanines, especially with respect to intermolecular coupling.

The presence of electron-withdrawing ring substituents, such as halogens, lowers the energy of the molecular orbitals (MOs), including the frontier orbitals over a wide range. This effect was indicated for a number of phthalocyanines, including those bearing F-groups, by quantum chemical calculations of isolated molecules, by the observed shifts of the electrochemical potential of molecules in solution and by shifts of the ionization energy obtained by photoelectron spectroscopy for molecules in the gas phase. Even though additional solid-state effects are superimposed on molecular changes, the trends observed for individual molecules are clearly preserved in thin films, as exemplified by the ease of reduction and, hence, observed n-type conduction for fluorinated phthalocyanines. In particular, $F_{16}$Pc materials are interesting candidates for n-type channels in organic field effect transistors, being relatively stable even under ambient conditions. A further step in the direction of orbital stabilization is represented by the introduction of perfluorinated alkyl groups as Pc ring substituents.

If applicable to a given molecule, vapor deposition has turned out to be a valuable method of film preparation for organic semiconductor thin films because of a high degree of purity and because a structural control can be established. Aside from unsubstituted Pc only few substituted Pcs like fluoro-substituted $F_4$Pc, $F_8$Pc, $F_{14.5}$Pc or $F_{16}$Pc can be vapor deposited.

Despite efforts to date, a need remains for additional compounds/molecules that provide and/or support advantageous applications, including thin film applications, and associated methods for synthesis thereof. These and other needs are satisfied by the advantageous compounds/molecules disclosed herein, as well as methods for synthesis and applications of such compounds/molecules.

SUMMARY

Vapor deposition of thin films consisting of $F_{64}$PcCu, $F_{64}$PcV=O, and $F_{64}$PcZn are disclosed herein. The full characterization of the films formed by these representatives of the new class of $F_{64}$PcM compounds supports wide-ranging and highly advantageous applications for the disclosed materials. Surprisingly, $F_{64}$PcM compounds, whose MW is more than double that of $F_{16}$PcM, can also be used to prepare thin films by vapor-deposition, in spite of their high molecular mass and the presence of bulky substituents at the benzene moieties. The electrical and optical properties of the new thin film materials, as well as the electronic coupling of adjacent molecules in the solid state, characterize the films and can be probed by optical transmission measurements, spectroscopic ellipsometry and electrical conduction measurements to reveal the formation of conductive pathways.

The disclosed ligand exhibits bulky i-$C_3F_7$ ($R_f$) peripheral groups and can be sublimed under high vacuum conditions. In addition, the disclosed compounds/molecules produce advantageous thin films (20-100 nm) on glass substrates by physical vapor deposition. Intensely colored homogeneous films were obtained. In situ electrical conduction and optical transmission measurements were performed during the deposition process in order to reveal the formation of conducting pathways, the mechanism of film growth as well as potential microscopic intermolecular electronic couplings. Solid-state transmission UV-Vis spectra that resemble the solution spectra, modulated by spectral broadening caused by fluctuations in the local chemical and dielectric environments, suggest the presence of only a small extent of intermolecular interactions. This was confirmed by detailed spectroscopic ellipsometry. Specific conductivity values, ranging from $10^{-11}$-$10^{-9}$ S cm$^{-1}$ also indicate weak intermolecular coupling. The quasi-independent character of the molecules in solid state is consistent with observations in solution and is likely due to the steric effects of the peripheral $R_f$ groups. The strongly electron-withdrawing characteristics of the $R_f$ substituents is responsible for the predicted n-type conduction, confirmed by a further decrease in specific conductivity observed upon exposure of the films to air. Potential applications of this new class of molecules as semiconductor materials and in devices are discussed.

Figure 1A:
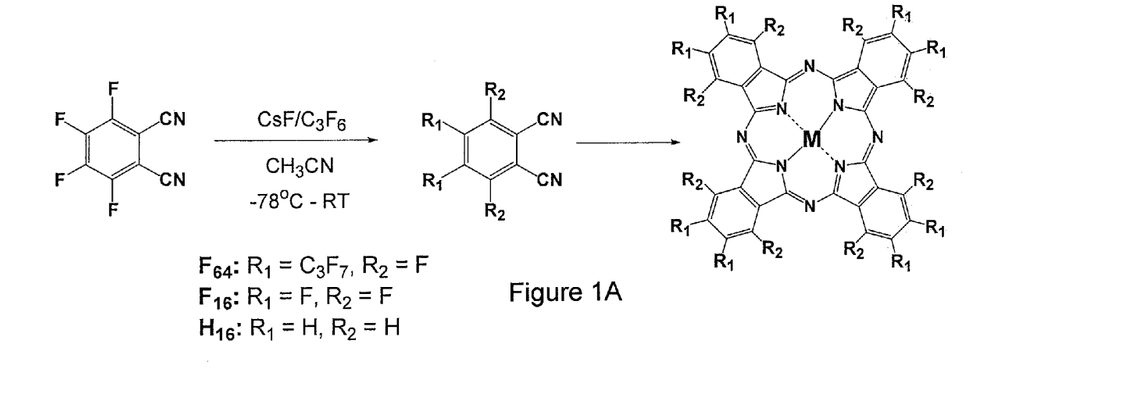

More particularly, the present disclosure provides a first compound/molecule, 1,4,8,11,15,18,22,25-octakis-fluoro-2,3,9,10,16,17,23,24-octakis-perfluoro(isopropyl)phthalocyanine ($F_{64}Pc$, FIG. 1). The presence of $R_f$ groups, importantly, introduces both qualitative and quantitative differences in the orbital configurations of PcMs. Thus, the above-mentioned DFT calculations for $H_{16}PcFe$, $F_{16}PcFe$ and $(R_f)_8F_8PcFe$—with various $R_f$ perfluoroalkyl groups—e.g., with $R_f$=$CF_3$ ($F_{32}$), $C_2F_5$ ($F_{48}$) or $C_3F_7$ ($F_{64}$) (only the latter being available and structurally characterized [22])—indicate that the order of the three lowest states is $^3B_{2g}$>$^3E_g$>$^3A_{2g}$, for $H_{16}PcFe$ and $F_{16}PcFe$. As soon as an $R_f$ group is considered, however, the order of the three lowest states becomes opposite to the previous two cases, viz., $^3B_{2g}$<$^3E_g$<$^3A_{2g}$. The new order is maintained regardless of the size of $R_f$.

The valence MO levels in $F_{16}PcFe$ are stabilized by ~1.5 eV relative to those in $H_{16}PcFe$. When eight peripheral F-atoms are replaced by $CF_3$-groups, i.e., going from $F_{16}PcFe$ to $F_{32}PcFe$, the MO levels shift further, but with different magnitudes due to the order reversal mentioned above. Homologation of $F_{32}PcFe$ to $F_{48}PcFe$ introduces an additional 0.2 eV shift while preserving the overall MO pattern. For closed-shell metals, the results are similar. Thus, semi-empirical ZINDO calculations for both $H_{16}PcZn$ and $F_{48}PcZn$ followed by TDDFT calculations for the series $H_{16}PcZn$ to $F_{16}PcZn$ to $F_{48}PcZn$ reveal ~1.3 eV and ~1.1 eV stabilization of the first ionization potentials, respectively, giving a total shift of 2.4 eV. Semi-empirical PM3 calculations also reveal a 1.0 eV energetic stabilization of the frontier orbitals of $F_{64}PcZn$ relative to those of $F_{16}PcZn$. This difference between F and $R_f$ groups can be rationalized by the absence of π back-bonding of $R_f$ groups, which results in their overall higher electron-withdrawing capability relative to aromatic F groups, which do exhibit π back-bonding. The calculated energy stabilization of the frontier orbitals is reflected by the positive 0.6 V shift of the electrochemical redox potential of the first ring-centered reduction in $F_{64}PcZn$ compared to $F_{16}PcZn$, and the suppression of oxidation. Similar variations were observed for the electron affinities, indicating virtually no $R_f$ effects on the HOMO-LUMO gaps when M=Zn, but significant effects were observed on the HOMO-1-HOMO-2 gaps. Such ease of reduction should lead to clear n-type conductivity of $F_{64}Pc$ in the presence of even weak donors, while the absence of oxidation should lead to a high stability in air.

Additional features, functions and applications of the disclosed compounds/molecules will be apparent from the detailed description which follows, particularly when read in conjunction with the accompanying figures.

BRIEF DESCRIPTION OF THE ACCOMPANYING FIGURES

To assist those of ordinary skill in the art in making and using the disclosed compounds/materials, reference is made to the accompanying figures, wherein:

FIG. 1 (a) provides synthesis and structure of 1,4,8,11,15,18,22,25-octafluoro-2,3,9,10,16,17,23,24-octaperfluoro (isopropyl)phthalocyanines (F64PcM) with unsubstituted PcM and F16PcM shown for comparison.

FIG. 1 (b) provides "ball-and-stick" representations of the X-ray structures of $F_{64}PcCu$ (top) and $F_{64}PcVO$ (bottom). The Cu is located at the geometric centre of the planar Pc macrocycle. Two axial ethyl acetate ligands are omitted for the sake of clarity. The V is located 0.4 Å above the plane of the four coordinated nitrogen atoms. The Pc macrocycle adopts a slightly concave conformation, with a $H_2O$ molecule (not shown) coordinated trans to the vanadyl group.

DESCRIPTION OF EXEMPLARY EMBODIMENT(S)

1. Experimental a. Materials and Pc Complexes:

Reagents used for preparations of $F_{64}PcM$ were purchased from commercial sources and used without purification, unless stated otherwise. Perfluoro-(4,5-di-isopropyl)phthalonitrile was prepared according to the literature. $^1H$, $^{13}C$ and $^{19}F$ NMR spectra were recorded using a Bruker 300 MHz instrument. A Discover CEM reactor was used for microwave-assisted synthesis. Mass-spectra were recorded at the Universities of Bremen and Michigan Mass Spectrometry facilities. 1,4,8,11,15,18,22,25-octakis-fluoro-2,3,9,10,16, 17,23,24-octakis-perfluoroisopropyl zinc(II) phthalocyanine, $F_{64}PcZn$ was prepared by mixing 0.25 g (0.50 mmol) of perfluoro-(4,5-di-isopropyl)phthalonitrile with 0.02 g (0.13 mmol) $Zn(CH3COOH)_2.2H_2O$ adding two drops of N,N-dimethylformamide (DMF), and microwave heating the mixture to 200° C. in a sealed tube for 10 minutes. Chromatographic purification using $SiO_2$ (acetone:hexane 3:7 by volume) followed by re-crystallization from acetone gave $F_{64}PcZn$ in 95% yield. The IR, $^1H$ and $^{19}F$ NMR, UV-Vis and EI-MS spectra were identical to those reported previously for the same complex prepared in 21% yield via a classical method.

Figure 1B:
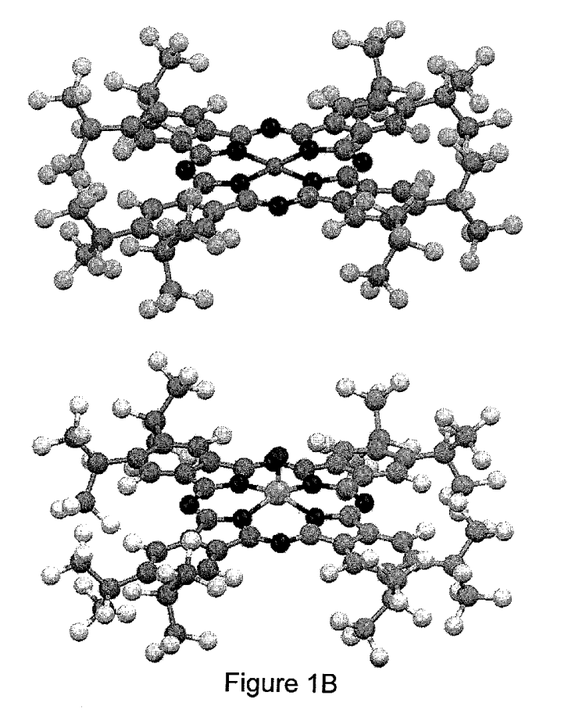

$F_{64}PcCu$ was prepared via a similar procedure. A mixture of perfluoro-(4,5-di-isopropyl)phthalonitrile (0.5 g, 1 mmol) and $Cu(CH_3COO)_2.H_2O$ (0.1 g, 0.5 mmol) was microwave heated to 140° C. for 10 min. The crude mixture was washed with toluene and acetonitrile and chromatographed using $SiO_2$ to give 233 mg of $F_{64}PcCu$ (45% yield). UV-Vis (ethanol, $1\times10^{-5}$ mol/l) λnm (log ∈): 681 (5.4), 613 (4.67), 383 (4.8). EI-MS (200° C., 70 eV): m/z 2063 [M+]. IR (KBr): ν=1597 w, 1507 s, 1454 s, 1286 vs, 1247 vs, 1219 vs, 1169 vs, 1187 vs, 1104 vs, 984 s, 967 s, 752 s, 730 s $cm^{-1}$. A preliminary single-crystal X-ray analysis confirmed the planar structure of the ligand with a Cu atom located at its center and indicated the coordination of volatile ethyl acetate molecules (FIG. 1b). The ethyl acetate molecules are not observed in the mass spectra (MS).

$F_{64}PcVO$ was prepared similarly by heating perfluoro-(4,5-di-isopropyl)phthalonitrile (0.5 g, 1 mmol), $VOCl_3$ (0.4 ml) and 0.05 ml of dry DMF at 225° C. for 10 min. The crude product was washed with dilute HCl, and chromatographed on $SiO_2$ to obtain $F_{64}PcVO$ as a dark-blue solid in 56% yield. UV-Vis (EtOAc, $1\times10^{-5}$ mol/l) λnm (log ∈): 693 (5.31), 625 (4.64), 387 (4.83). EI-MS (200° C., 70 eV): m/z 2067 [M]+. IR (KBr): ν=1457 m, 1331 m, 1283 vs, 1247 vs, 1219 vs, 1171 vs, 1149 s, 1101 vs, 1054 m, 984 s, 969 s, 861 m, 783 m, 754 s, 731 s $cm^{-1}$. Single-crystal X-ray structure reveals the expected 1,4,8,11,15,18,22,25-octafluoro-2,3,9,10,16,17,23, 24-octaperfluoro(isopropyl) substituents at the ligand, the vanadyl group and a trans-$H_2O$ molecule is noted, FIG. 1b.

b. Thin Film Preparation and Measurements:

Thin films were prepared by vapor-deposition. The electronic coupling of adjacent molecules in the solid films was probed by optical transmission and electrical conduction measurements. Glass substrates (Menzel Glaser, Germany) were purified by washing with acetone (Rotipuran, 99.98%) and used as such for the optical transmission experiments. For the electrical conduction measurements 100 nm thick silver electrodes were Ar+-RF-sputtered (Leybold Z 400, $10^{-3}$ mbar, 1500 V) using a shadow mask to leave a gap of approximately 40 μm×10 mm. Substrates with such electrodes were mounted in the deposition chamber and contacted by mechanical spring-loaded contacts. The offset-current measured across the uncovered insulating gap on glass in vacuum was used to determine the effective electrode distance, assuming the lowest offset current of $7.08\cdot10^{-12}$ A to be characteristic of an electrode distance of 40 μm.

$F_{64}PcMs$ were evaporated from BN crucibles (Kurt J. Lesker) resistively heated to about 280° C. by a Ta wire, a range also typical in our experiments for the deposition of unsubstituted and perfluorinated phthalocyanines. During deposition, the substrate temperature rose to 313° K under high vacuum conditions (base pressure $10^{-8}$ mbar). The deposited amount was monitored by changes in the resonance frequency of a quartz crystal microbalance (QCM, Sunny 30, 03-41 (A)) mounted next to the substrate. The average film thickness was calculated based on the density of each $F_{64}PcM$ determined from ellipsometry (see below). The evaporation rates, controlled by changing the heating current, were adjusted to about 0.1 nm $min^{-1}$.

UV-Vis absorption spectra were measured during deposition with a Tec5 Evaluation Line spectrometer. For the measurements the films were rotated out of the molecular deposition beam and perpendicular to the light path of an optical fiber mounted to the vacuum system. Conductance measurements were also performed during film growth at 10V applied voltage with a Keithley 487 picoammeter. Following deposition, the development of current along the thin film was measured at 298° K with elapsing time without breaking the vacuum, before the chamber was finally vented with air. Using the correction of the electrode distance (see above), effective values of the specific conductivity were obtained corresponding to the average film thickness deposited. Optical microscopy (Nikon Optiphot) was used to assess the film's homogeneity. The film texture was analyzed by a Nanosurf easyscan atomic force microscope in the oscillating cantilever mode. Spectroscopic ellipsometry was performed at air using a variable angle spectrometer (Woollam Co. Eng., Lincoln, Nebr.) in the energy range from 0.73 to 4.7 eV, with a step of 0.02 eV at different angles of incidence (60°, 65°, 70° and 75°) for samples of two different film thicknesses of each material. Measurements were performed from the front and backside of the samples. Bare substrates were measured as a reference. Films were assumed to consist of a compact layer of the $F_{64}Pc$ covered by a roughness layer which was modeled by an effective medium of 50% sample material and 50% air.

The results were fitted in a multi-sample analysis manner to simultaneously fit all samples at all angles, thicknesses, including front and backside measurements and also the transmission spectra to determine the thicknesses of the compact and the roughness layers as well as the optical constants n and k for each material. The average film thickness was calculated by adding 50% of the roughness layer thickness to the compact layer thickness. The material's density ρ was calculated as the ratio of the deposited amount and the average film thickness (Table 1). This value of ρ was used to calibrate the QCM as thickness monitor. The crystallographic densities were calculated based on unit cell volumes and contents.

The effective mobility of charge carriers was determined from field effect measurements using an OFET (organic field effect transistor) test structure. This structure consisted of phosphor-doped silicon (n~$3\cdot10^{17}$ $cm^{-3}$) as substrate and gate electrode. A thermal $SiO_2$ layer with a thickness of 90 nm was used as dielectric. As source and drain electrodes, a 10 nm ITO (adhesive layer) was sputtered and a 30 nm thick gold film was evaporated. The structuring was done by a lift-off procedure. The resulting channel length L was 5 µm and the width W was 195 mm. The field effect measurements were carried out with a Keithley SCS 4200 (semiconductor characterization system) and several Keithley SMU's 336 (source measure unit) under ambient conditions.

2. Results And Discussion a. Optical Transmission and Morphology

Thin films of $F_{64}PcVO$, $F_{64}PcCu$, and $F_{64}PcZn$ vapor-deposited on glass substrates exhibit a homogeneous blue-color. AFM analysis (see insets of FIGS. 2-4) revealed the growth of rather smooth films at 10-20 nm height oscillations for films of 100 nm average film thickness and lateral grain sizes of 50-500 nm. Changes in the optical transmission spectra were measured during film growth to analyze the extent of intermolecular electronic coupling characteristic in solid state phthalocyanines spectra.

Figure 2:
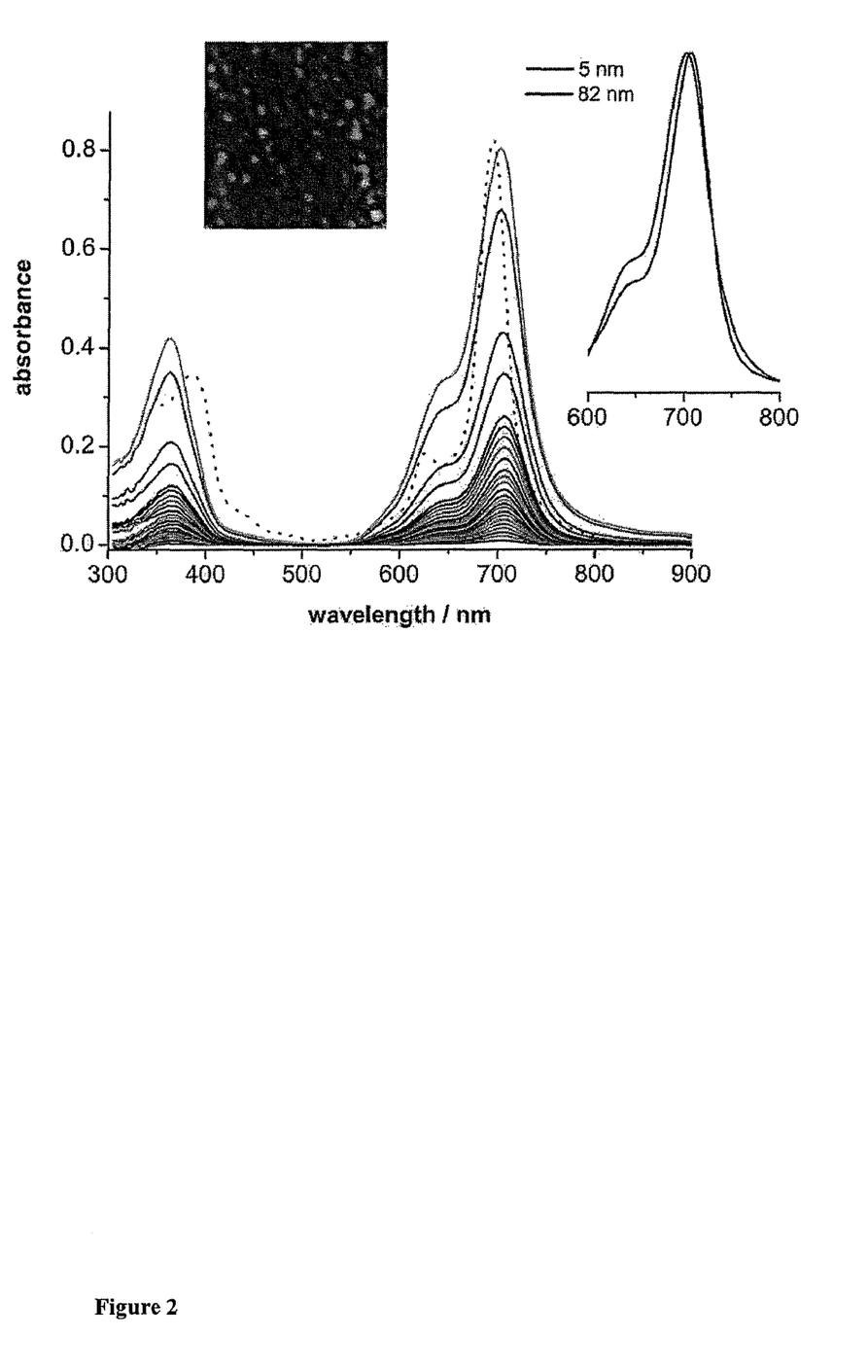
FIG. 2 provides optical absorbance spectra measured during vapor deposition of 0.6 to 98 nm average film thickness of $F_{64}PcVO$ deposited on glass at room temperature. The spectrum of a solution in acetone is plotted as a dotted line. A comparison between 5 nm and 82 nm thin films at normalized intensity and the texture of a 115 nm thin film determined by AFM (3×3 μm, 10 nm height scale) are shown as insets.

FIG. 2 shows a series of spectra as obtained from the monolayer range to an average film thickness of about 100 nm of $F_{64}PcVO$. A solution spectrum of $F_{64}PcVO$ is also shown in FIG. 2. The absorption bands of the individual molecules in solution were also observed in the thin film spectra with just slightly shifted band positions that are attributed to changes in the dielectric environment and small changes in the vibrational fine structure of molecules in thin films as opposed to molecules in solution. Spectral broadening and splitting of bands as characteristic for intermolecular coupling in other examples of phthalocyanine solid film spectra was almost negligible in films of $F_{64}PcVO$, speaking in favor of very weak intermolecular coupling. Almost identical spectra were obtained at different average film thickness, speaking for a constantly low intermolecular coupling throughout the studied thickness regime.

Optical absorbance spectra of films of $F_{64}PcCu$ (FIG. 3) resemble those of $F_{64}PcVO$, but exhibit an even smaller difference relative to solution spectra and further decreased thickness dependence. The difference among the Cu and the VO complexes are considerably smaller than those observed for unsubstituted $H_{16}PcVO$ vs. $H_{16}PcCu$, or for $F_{16}PcVO$ vs. $F_{16}PcCu$, again indicating the small contribution of intermolecular electronic coupling in $F_{64}Pc$ caused by strong peripheral hindrance by the $R_f$ groups and hence little difference caused by the presence or absence of an additional O-atom. In spite of small intermolecular electronic coupling, rather smooth extended solid domains of $F_{64}PcCu$ were formed. Films of $F_{64}PcZn$ showed larger differences to the solution spectrum, in particular for the fine structure of the Q-band, indicating interactions of the molecules in the solid state by an increased probability of the 0-1 relative to the 0-0 vibrational branch of the band.

Figure 4:
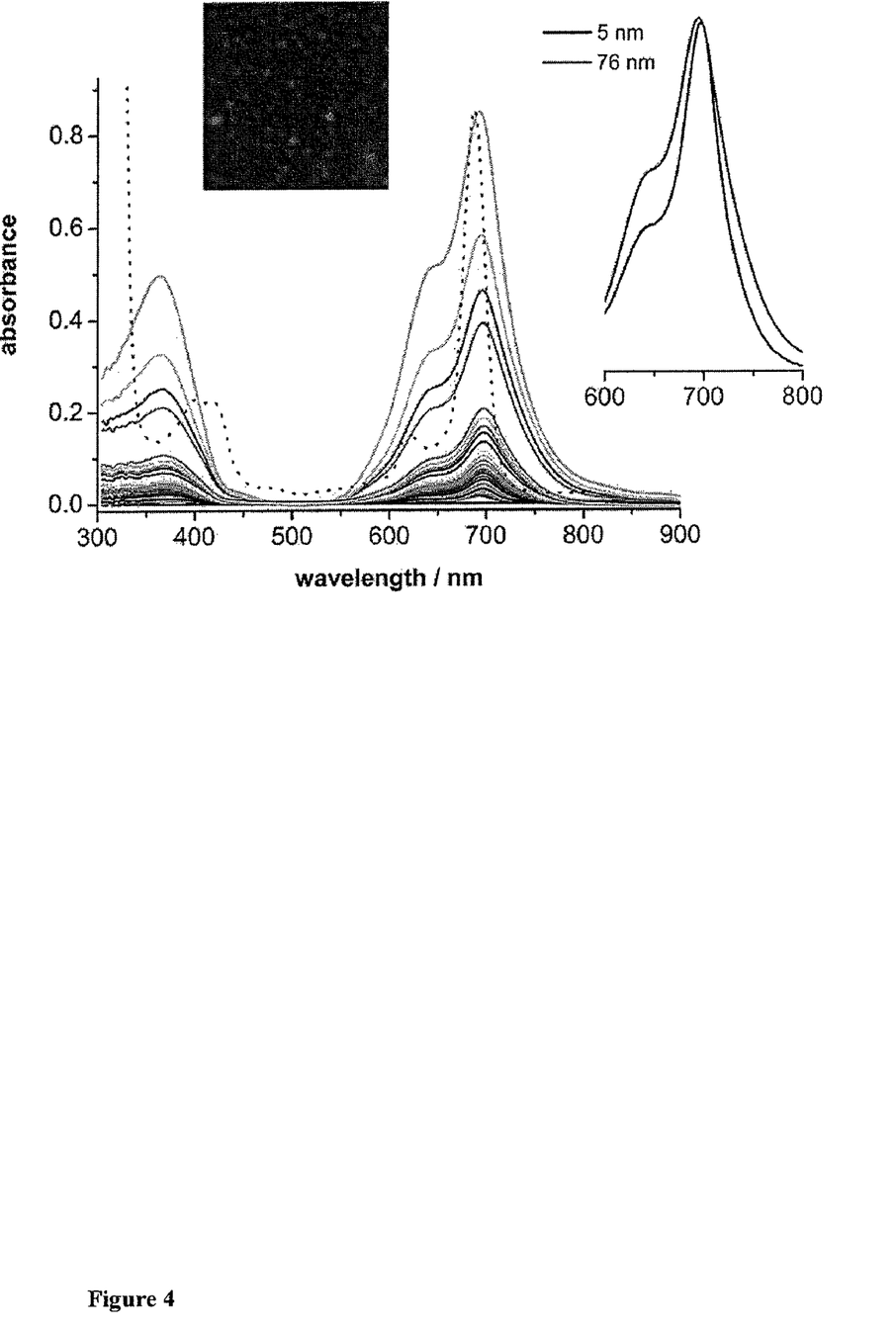
FIG. 4 provides optical absorbance spectra measured during vapor deposition of 0 to 114 nm average film thickness of $F_{64}PcZn$ deposited on glass at room temperature. The spectrum of a solution in acetone (dotted line) is plotted for comparison. A comparison between 5 nm and 76 nm thin films at normalized intensity and the texture of a 95 nm thin film determined by AFM (3×3 μm, 10 nm height scale) are shown as insets.

Also, an increased average film thickness of $F_{64}PcZn$ led to the largest band width among the studied $F_{64}PcM$ films (FIG. 4). Compared with unsubstituted $H_{16}PcZn$ or $F_{16}PcZn$, however, these interactions are still very small, confirming the peripheral hindrance of intermolecular coupling by the $R_f$ groups and the expected loss of both axial acetone molecules observed in single-crystals by X-ray diffraction.

b. Spectroscopic Ellipsometry

Figure 5:
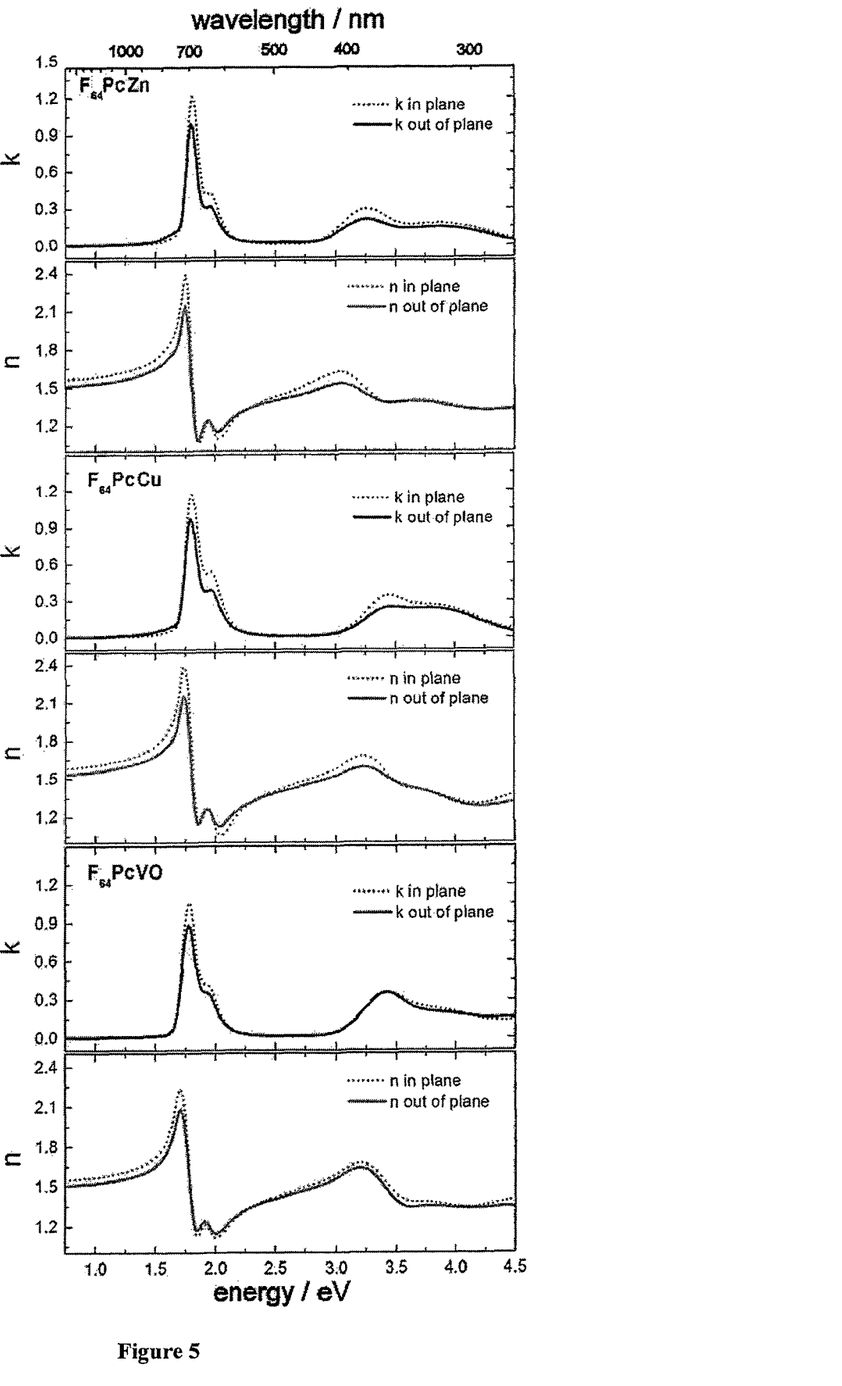
FIG. 5 provides in-plane and out-of-plane components of the extinction coefficient k and the refractive index n for thin films of $F_{64}PcZn$, $F_{64}PcCu$ and $F_{64}PcVO$ calculated by a coupled multi-sample analysis from angle-dependent spectroscopic ellipsometry from front- and backside of two samples each and the corresponding transmission spectra.

The optical constants and the density $\rho$ of $F_{64}PcZn$, $F_{64}PcCu$, and $F_{64}PcVO$ in thin films were determined from angle-dependent spectroscopic ellipsometry for films of different film thickness, as listed in Table 1. The spectral dependence of the extinction coefficient k and the refractive index n parallel to the substrate surface (in-plane) and parallel to the surface normal (out-of-plane) for $F_{64}PcZn$, $F_{64}PcCu$, and $F_{64}PcVO$ are shown in FIG. 5.

Figure 3:
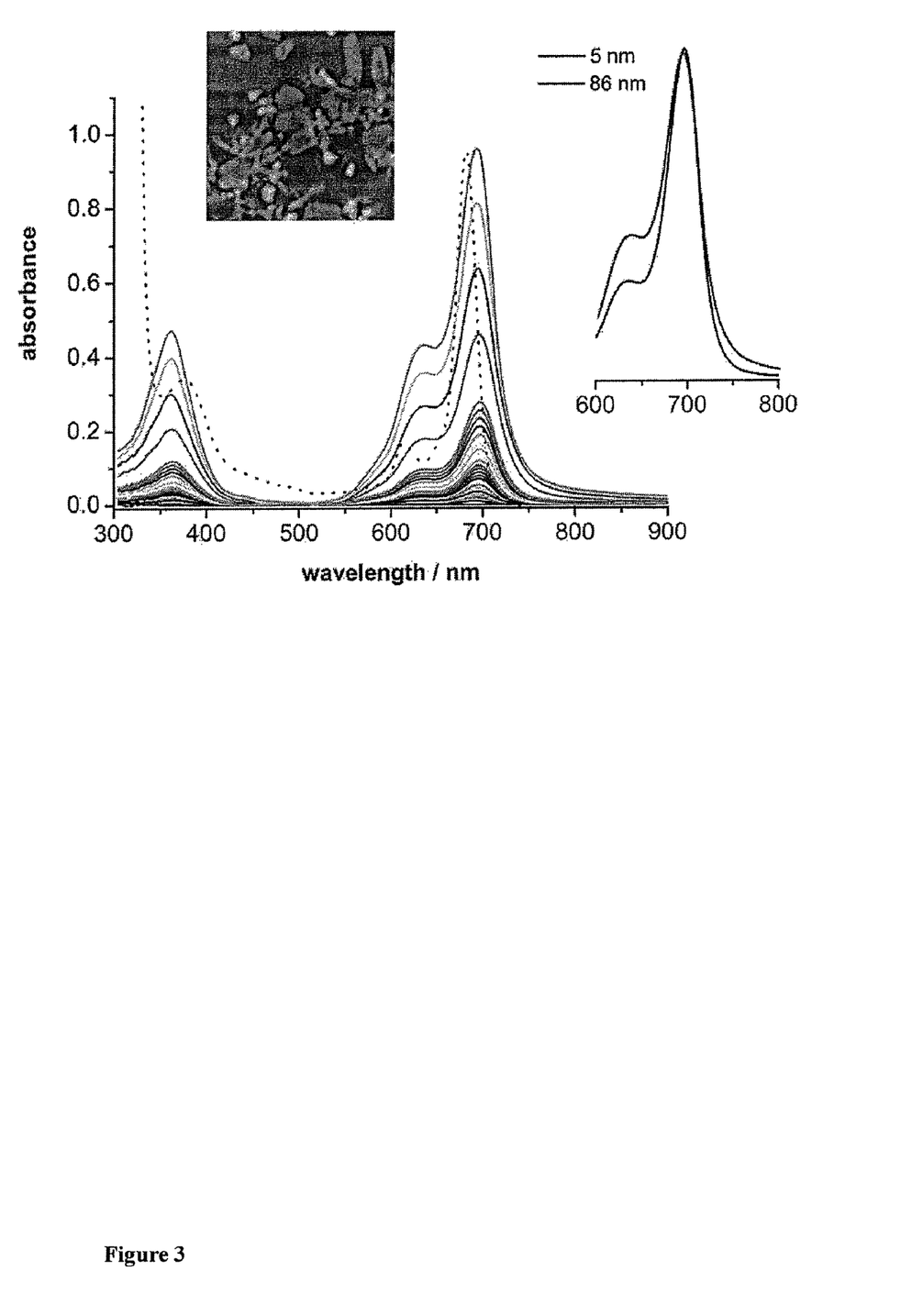
FIG. 3 provides optical absorbance spectra measured during vapor deposition of 0 to 86 nm average film thickness of $F_{64}PcCu$ deposited on glass at room temperature. The spectrum of a solution in acetone is plotted for comparison as a dotted line. A comparison between 5 nm and 86 nm thin films at normalized intensity and the texture of a 90 nm thin film determined by AFM (3×3 μm, 20 nm height scale) are shown as insets.

The spectral dependence of the extinction coefficient almost perfectly resembles the absorption spectra measured in transmission (FIGS. 2-4). Only very little differences were observed for the two directions in all films. Slightly larger values in-plane indicate an only subtle preference of molecules oriented parallel to the substrate compared to those oriented normal to the surface, so the results are quite well in line with a random distribution of molecular orientation, which speaks in favor of small chemical interaction also with the substrate. This again is in strong contrast to the growth of, e.g., $F_{16}Pc$, where a preferential orientation of the molecules either parallel to the surface or normal to it was found for Zn, Cu and VO complexes.

The density $\rho$ determined from the same multi-sample analysis (Table 1) is considerably smaller for the $F_{64}PcM$ when compared with $H_{16}PcZn$, $H_{16}PcCu$, $H_{16}PcVO$ (1.62 g cm$^{-3}$ [36], 1.62 g cm$^{-3}$, and 1.6 g cm$^{-3}$, respectively) or with $F_{16}PcCu$, $F_{16}PcVO$ (1.97 g cm$^{-3}$, and 2.15 g cm$^{-3}$, respectively), well in line with the small extent of intermolecular interaction concluded from the optical absorption spectra. The density here determined for thin films of the $F_{64}PcM$ was found considerably lower than the density of 1.89 g cm$^{-3}$, 1.94 g cm$^{-3}$ and 1.74 g cm$^{-3}$ calculated for single crystals of $F_{64}PcZn$ with incorporated acetone, $F_{64}PcCo$ with incorporated acetone and $F_{64}PcCo$ with incorporated 1-triphenylphosphoranylidene-2-propanone, respectively. From recently obtained crystals of $F_{64}PcCu$.2(ethyl acetate) and $F_{64}PcVO$.2(acetone).(H$_2$O).(methyl ethyl ketone), densities of 1.94 and 1.85 g cm$^{-3}$, respectively, were calculated.

Obviously, the solvent molecules incorporated into the crystals of $F_{64}PcM$ lead to a denser packing of the $F_{64}PcM$ molecules than in pure $F_{64}PcM$ thin films, caused by a changed intermolecular interaction of $F_{64}PcM$ molecules in the presence of the solvent molecules. Among the three $F_{64}PcM$ in the thin films, the density of $F_{64}PcVO$ was found significantly lower than that of $F_{64}PcZn$ and $F_{64}PcCu$, well in line with the optical and electrical characteristics. This trend is consistent with the observed crystallographic densities, whose values for M=Cu and the Zn complexes are similar but significantly higher that the value for M=VO.

c. Electrical Characterization

Even though the effective specific conductivities determined for F64PcM turned out to be extremely low, it was again F64PcZn that showed the highest values, indicating the highest extent of intermolecular electronic coupling among the studied F64PcM.

Figure 6:
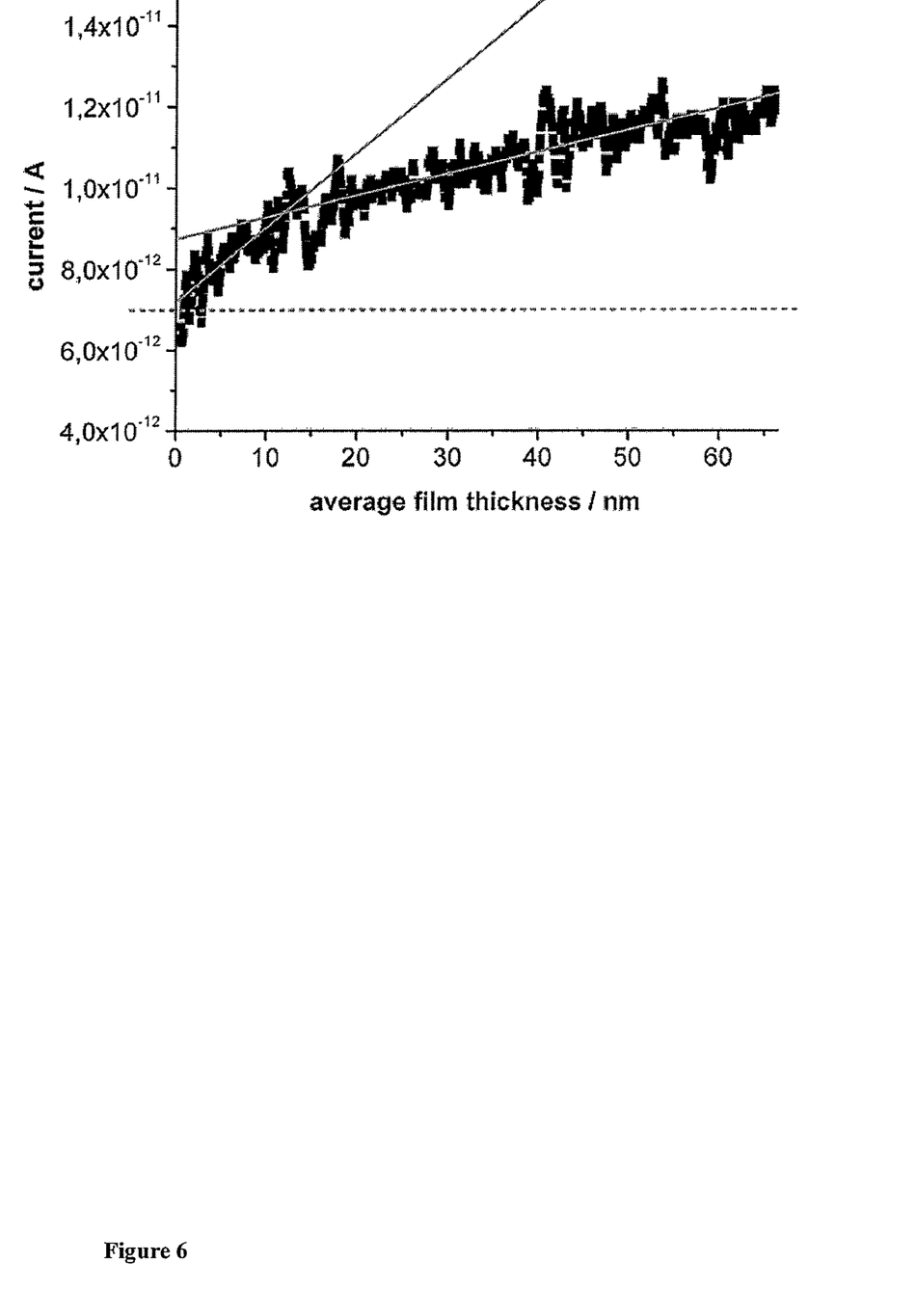
FIG. 6 provides current measured across an insulating gap during vapor deposition of $F_{64}PcZn$. The experimental offset current is plotted as a dotted line. The linear fits in the beginning of film growth (0-10 nm) and in the subsequent range (19-57 nm) are used to calculate the effective specific conductivity of the material in these domains (Table 2).

FIG. 6 provides an example of an experimental sequence in which the current between two silver electrodes was studied across a glass surface while F64PcZn was deposited. The increase of effective conductivity above the offset current of the experimental setup (7·10$^{-12}$ A) was highest in the beginning of deposition, indicating the growth of a thin conductive film in the monolayer range. Subsequently, the current increased at a decreased rate, indicating a decreased effective specific conductivity at increased average film thickness. Such decreasing contribution of material deposited beyond the monolayer regime has been observed in a number of examples of fluorinated phthalocyanines, often followed even by a decreased overall current because of structural rearrangements at the expense of the originally formed conductive layer. In the present set of experiments, this does not seem to be the case, although the sensitivity of the reported experiments relative to the low level of observed currents did not allow detailed investigation.

Experimental series, as depicted in FIG. 6, have repeatedly been performed for F64PcZn, F64PcCu and F64PcVO, and the results are collected in Table 2. Linear fits were used to estimate the effective specific conductivity along the films referred to the average film thickness in the beginning of the deposition and during growth of the films beyond the monolayer thickness range. Consistently, the effective specific conductivity was found to be larger in the beginning of the deposition when compared to the later stages of film growth. Furthermore, among the different F64PcM studied, the conductivity clearly decreased in a sequence F64PcZn>F64PcCu>F64PcVO.

Figure 7:
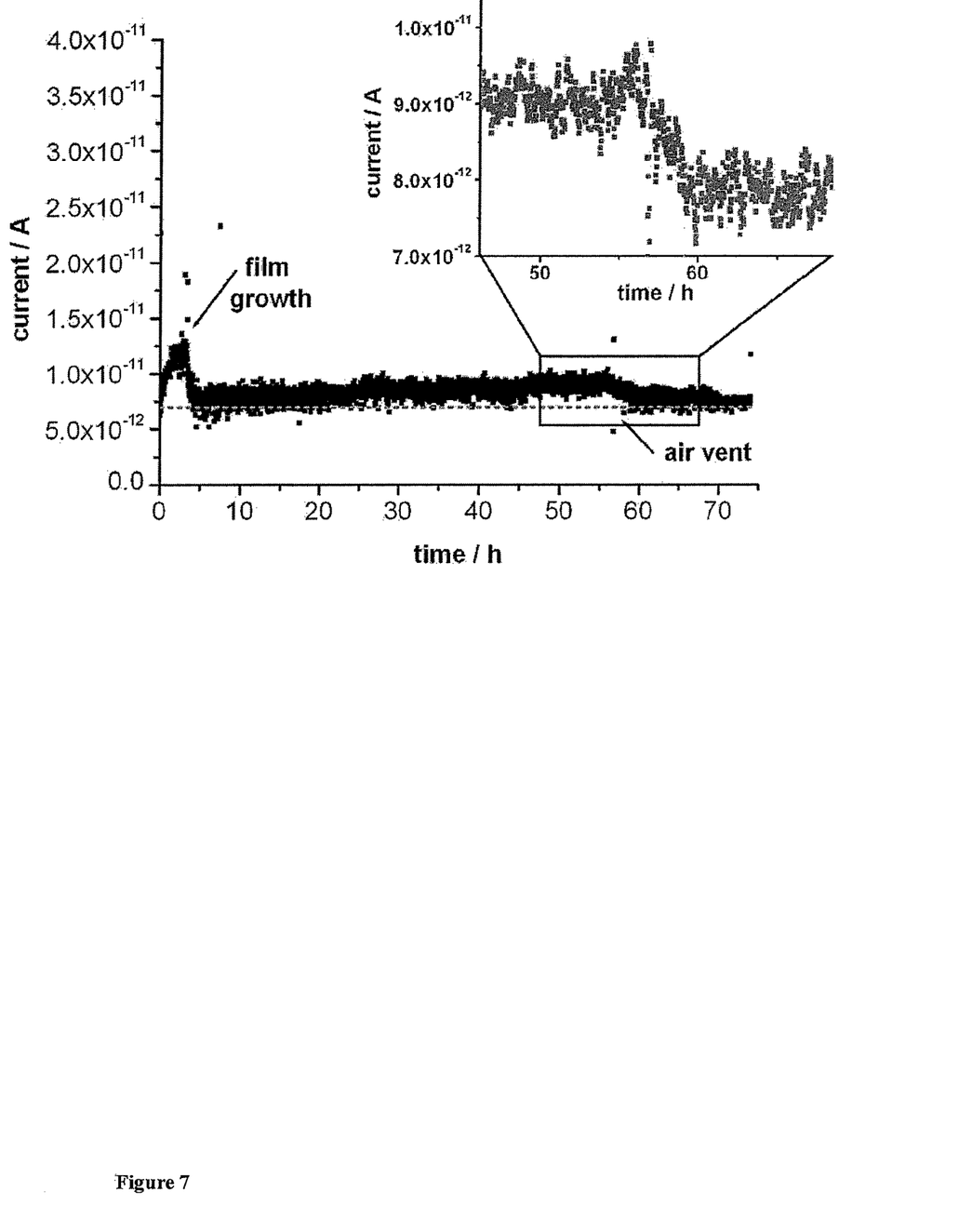
FIG. 7 shows development of current across an insulating gap during deposition (FIG. 5), conditioning in high vacuum, and exposure to air of a $F_{64}PcZn$ thin film (a). The inset shows detailed data during exposure to air (b).

Field-effect measurements were performed for films of F64PcZn as the most promising of the presently studied materials and an effective mobility of less than $10^{-10}$ cm$^2$V$^{-1}$ s$^{-1}$ was estimated from measurements close to the detection limit of the experiment. FIG. 7 shows the current across a film of F64PcZn measured after the deposition shown in FIG. 6. The current decreased subsequent to the deposition, caused by a decrease in surface temperature when the deposition was stopped. A widely constant, perhaps slightly increasing current, was observed when the film was subsequently kept in high vacuum. A clear decrease was observed when the film was exposed to air during venting of the chamber (see inset). Since oxygen can only act as an electron acceptor and since the conductivity is decreased, this observation speaks in favor of the expected n-type conduction of the films in vacuum.

d. Conclusions

Thin homogeneous films of $F_{64}$PcZn, $F_{64}$PcCu and $F_{64}$PcVO were successfully grown by physical vapor deposition. The moderate sublimation temperatures, in the range of unsubstituted PcM and $F_{16}$PcM in spite of the high molecular weight of the $F_{64}$PcM molecules, suggest decreased intermolecular interactions in the solid powder of $F_{64}$PcM compared to $H_{16}$PcM or $F_{16}$PcM. The narrow bands observed in the optical absorbance spectra collected during deposition of the thin films on glass and the extinction coefficients determined by subsequent spectroscopic ellipsometry measurements closely resemble the diluted solution spectra, suggesting a virtual lack of intermolecular coupling of the molecular electronic transitions. The low electric conductivity and the low charge carrier mobility completed the picture of very weak electronic coupling in thin films of $F_{64}$PcM. The density in the thin films determined by spectroscopic ellipsometry showed considerably lower values than observed for $H_{16}$PcM or $F_{16}$PcM. A decreased tendency of aggregation compared with $F_{16}$PcZn was also observed earlier when concentration-dependent optical absorption spectra were measured in solutions of $F_{64}$PcZn.

Among the $F_{64}$PcM, a clear trend was observed with respect to molecular coupling energies, with $F_{64}$PcZn exhibiting the greatest molecular coupling energy and values decreasing towards $F_{64}$PcCu and $F_{64}$PcVO. This was concluded from the sequence of band width in optical absorbance spectra ($F_{64}$PcZn>$F_{64}$PcCu, $F_{64}$PcVO) confirmed by spectroscopic ellipsometry and is also in line with the sequence of the effective specific conductivities determined in the beginning of deposition or during film growth ($F_{64}$PcZn>$F_{64}$PcCu>$F_{64}$PcVO) and the obtained density of packing in the films ($F_{64}$PcZn, $F_{64}$PcCu>$F_{64}$PcVO). The decreasing effective specific conductivity under air is characteristic for a compensation of n-doping by the acceptor oxygen, as generally observed for n-doped organic semiconductors. This reaction confirmed the expected n-type conducting behavior caused by the strong acceptor character of the molecules determined earlier in quantum chemical calculations and electrochemical redox measurements.

Because of the small extent of intermolecular electronic coupling and hence low charge carrier mobility, typical applications that rely upon charge transport along domains of the materials do not appear very suitable. $F_{64}$PcM and other $(R_f)_8F_8$Pc may be of great value, however, in surface modifications, interfacial reactions and in mixed bulk materials based on an unique combination of strong acceptor character and low aggregation tendency. Examples for applications that dwell on and stand to benefit from the monomolecular characteristics of $(R_f)_8F_8$Pc in vapor-deposited films include optical filters, non-linear optical devices, like optical limiters, and doping of inorganic or organic semiconductors.

Beyond the specific F64PcM complexes disclosed herein, it is further contemplated that related F64PcM complexes will offer comparable advantageous properties. For example, F64PcM complexes where M is TiO can be expected to provide similar advantageous results based on, inter alia, the ability of Pc macrocycles to accommodate both VO and TiO units. Similarly, a full range of transition metals can be accommodated by the F64Pc ligand, including specifically Cu, Zn, Co, Fe and Ru. Thus, the entire transition metal group of the periodic table can be expected to form advantageous films according to the present disclosure, since film formation is governed primarily by the nature of the organic ligand.

Although the present disclosure has been described with reference to exemplary and advantageous embodiments/implementations thereof, the present disclosure is not limited by or to such exemplary and advantageous embodiments/implementations.

REFERENCES

[1] P. Gregory, J. Porphyrins Phthalocyanines 4, 432 (2000).
[2] H. Brinkmann, C. Kelting, S. Makarov, O. Tsaryova, G. Schnurpfeil, D. Wöhrle, and D. Schlettwein, phys. stat. sol. (a) 205, 409 (2008).
[3] S. Isoda, S. Hashimoto, T. Ogawa, H. Kurata, S. Moriguchi, and T. Kobayashi, Mol. Cryst. Liq. Cryst. 247, 191 (1994).
[4] S. Hashimoto, S. Isoda, H. Kurata, G. Lieser, and T. Kobayashi, J. Porphyrins Phthalocyanines 3, 585 (1999).
[5] D. Schlettwein, H. Tada, and S. Mashiko, Langmuir 16, 2872 (2000).
[6] J. O. Osso, F. Schreiber, V. Kruppa, H. Dosch, M. Garriga, M. I. Alonso, and F. Cerdeira, Adv. Funct. Mater. 12, 455 (2002).
[7] M. I. Alonso, M. Garriga, J. O. Osso, F. Schreiber, E. Barrena, and H. Dosch, J. Chem. Phys. 119, 6335 (2003).
[8] D. G. de Oteyza, E. Barrena, J. O. Osso', S. Sellner, and H. Dosch, J. Am. Chem. Soc. 128, 15052 (2006). [9] O. D. Gordan, M. Friedrich, W. Michaelis, R. Kroger, T. Kampen, D. Schlettwein, and D. R. T. Zahn, J. Mater. Res. 19, 2008 (2004).
[10] W. Michaelis, D. Wöhrle, and D. Schlettwein, J. Mater. Res. 19, 2040 (2004).
[11] J. S. Louis, D. Lehmann, M. Friedrich, D. R. T. Zahn, J. Appl. Phys. 101, 013503 (2007).
[12] D. Schlettwein, K. Hesse, H. Tada, S. Mashiko, U. Storm, and J. Binder, Chem. Mater. 12, 989 (2000).

[13] C. Kelting, W. Michaelis, A. Hirth, D. Wöhrle, and D. Schlettwein, J. Porphyrins Phthalocyanines 10, 1179 (2006).

[14] K. Yase, N. Yasuoka, T. Kobayashi and N. Uyeda Acta Cryst. C44, 514-516 (1988).

The invention claimed is:

1. A manufacture, comprising:
   a. a substrate; and
   b. a compound deposited on the substrate through vapor deposition, the compound having the formula: $F_{64}PcM$, wherein: F is fluorine, Pc is phtalocyanine, and M is selected from the group consisting of a transition metal, V=O and TiO.

2. The manufacture according to claim 1, wherein M is selected from the transition metal group consisting of Cu, Zn, Co, Fe and Ru.

3. The manufacture according to claim 1, wherein the compound defines a thin film on the substrate.

4. The manufacture according to claim 3, wherein the thin film is within a range of about 20 nm to about 100 nm.

5. The manufacture according to claim 1, wherein the vapor deposited material defines one or more conductive pathways on the substrate.

6. The manufacture according to claim 1, wherein the substrate and vapor deposited compound define a semiconductor element.

7. A method for forming a manufacture, comprising:
   a. providing a substrate; and
   b. vapor depositing a compound on the substrate, the compound having a formula $F_{64}PcM$, wherein: F is fluorine, Pc is phtalocyanine, and M is selected from the group consisting of a transition metal, V=O and TiO.

8. The method of claim 7, wherein M is selected from the transition metal group consisting of Cu, Zn, Co, Fe and Ru.

9. The method of claim 7, wherein the vapor deposition step includes sublimating the compound before vapor depositing such compound on the substrate.

10. The method of claim 7, wherein vapor deposition is effective to define a thin film of the compound on the substrate.

11. The method of claim 10, wherein the thin film is within a range of about 20 nm to about 100 nm.

12. The method of claim 7, wherein vapor deposition is effective to define one or more conductive pathways in the vapor deposited compound on the substrate.

13. The method of claim 7, further comprising forming a semiconductor from the vapor deposited substrate.

* * * * *